(12) United States Patent
Abe

(10) Patent No.: US 9,639,790 B2
(45) Date of Patent: May 2, 2017

(54) RESOLUTION CONVERSION USING DITHER PROCESSING

(71) Applicant: CANON KABUSHIKI KAISHA, Tokyo (JP)

(72) Inventor: Noboru Abe, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 16 days.

(21) Appl. No.: 14/633,549

(22) Filed: Feb. 27, 2015

(65) Prior Publication Data

US 2015/0254537 A1 Sep. 10, 2015

(30) Foreign Application Priority Data

Mar. 6, 2014 (JP) ................................ 2014-043851
Dec. 12, 2014 (JP) ................................ 2014-251850

(51) Int. Cl.
G06K 15/02 (2006.01)
H04N 1/40 (2006.01)
H04N 1/405 (2006.01)

(52) U.S. Cl.
CPC ....... *G06K 15/1876* (2013.01); *H04N 1/4055* (2013.01); *H04N 1/40068* (2013.01)

(58) Field of Classification Search
CPC ........... G06K 15/1876; G06K 15/1881; G09G 3/2044; G09G 3/2051; H04N 1/4051; H04N 1/40068
See application file for complete search history.

(56) References Cited

U.S. PATENT DOCUMENTS

| 7,375,843 | B2 | 5/2008 | Kaburagi | |
|---|---|---|---|---|
| 2004/0061903 | A1* | 4/2004 | Fujita | G06K 15/1223 358/3.06 |
| 2005/0219628 | A1* | 10/2005 | Yasutomi | H04N 1/4058 358/3.16 |
| 2009/0195835 | A1* | 8/2009 | Kashibuchi | H04N 1/40087 358/3.01 |
| 2010/0002265 | A1* | 1/2010 | Yasutomi | H04N 1/40087 358/3.06 |
| 2010/0103435 | A1* | 4/2010 | Namikata | G06T 3/0006 358/1.2 |
| 2012/0140248 | A1* | 6/2012 | Tamura | G03G 15/043 358/1.2 |
| 2013/0293928 | A1* | 11/2013 | Kashibuchi | G06K 15/1881 358/3.06 |
| 2015/0254538 | A1* | 9/2015 | Fukazawa | G06K 15/1878 358/1.9 |

FOREIGN PATENT DOCUMENTS

JP 2004-201283 7/2004

* cited by examiner

Primary Examiner — Nicholas Pachol
(74) Attorney, Agent, or Firm — Fitzpatrick, Cella, Harper & Scinto

(57) ABSTRACT

An image processing apparatus includes a dither processing unit configured to perform dither processing on image data having a first resolution M by using a dither threshold value matrix and a resolution conversion unit configured to perform resolution conversion to convert the image data that is generated by the dither processing unit and which has the first resolution M into image data having a second resolution N lower than the first resolution M by using a filter, and the pixel of a growth center of the dither threshold value matrix and the center pixel of the processing using the filter coincide with each other.

8 Claims, 15 Drawing Sheets

| | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 1 | 1 | 1 | 1 | 1 | 1 | 1 | 1 | 1 | 1 | 1 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 1 | 1 | 1 | 1 | 1 | 1 | 1 | 1 | 1 | 1 | 1 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| * | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | | * | | * | | * | | * | | * | | * | | * | | * | |

FIG.5

| | | | | | | | |
|---|---|---|---|---|---|---|---|
| 0 | 0 | 0 | 0 | 0 | 0 | 0 | 0 |
| 32 | 128 | 128 | 128 | 128 | 128 | 96 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 16 | 64 | 64 | 64 | 64 | 64 | 48 | 0 |
| 16 | 64 | 64 | 64 | 64 | 64 | 48 | 0 |
| 0 | 0 | 0 | 0 | 0 | 0 | 0 | 0 |

FIG.8

| 125 | 105 | 103 | 101 | 99 | 97 | 95 | 123 | 141 | 139 | 137 | 135 | 133 | 131 | 129 | 127 |
|---|---|---|---|---|---|---|---|---|---|---|---|---|---|---|---|
| 107 | 67 | 45 | 43 | 41 | 39 | 65 | 93 | 143 | 193 | 191 | 189 | 187 | 185 | 183 | 181 |
| 109 | 47 | 25 | 9 | 7 | 23 | 37 | 91 | 145 | 195 | 229 | 227 | 225 | 223 | 221 | 179 |
| 111 | 49 | 11 | 0 | 5 | 21 | 17 | 89 | 147 | 197 | 231 | 249 | 247 | 245 | 219 | 177 |
| 113 | 51 | 13 | 1 | 3 | 19 | 33 | 87 | 149 | 199 | 233 | 251 | 253 | 243 | 217 | 175 |
| 115 | 53 | 27 | 15 | 17 | 29 | 31 | 85 | 155 | 201 | 235 | 237 | 239 | 241 | 215 | 173 |
| 117 | 69 | 55 | 57 | 59 | 61 | 63 | 83 | 153 | 203 | 205 | 207 | 209 | 211 | 213 | 171 |
| 119 | 71 | 73 | 75 | 77 | 79 | 81 | 121 | 155 | 157 | 159 | 161 | 163 | 165 | 167 | 169 |
| 142 | 140 | 138 | 136 | 134 | 132 | 130 | 128 | 126 | 106 | 104 | 102 | 100 | 98 | 96 | 124 |
| 144 | 194 | 192 | 190 | 188 | 186 | 184 | 182 | 108 | 68 | 46 | 44 | 42 | 40 | 66 | 94 |
| 146 | 196 | 230 | 228 | 226 | 224 | 222 | 180 | 110 | 48 | 26 | 10 | 8 | 24 | 38 | 92 |
| 148 | 198 | 232 | 250 | 248 | 246 | 220 | 178 | 112 | 50 | 12 | 0 | 6 | 22 | 18 | 90 |
| 150 | 200 | 234 | 252 | 254 | 244 | 218 | 176 | 114 | 52 | 14 | 2 | 4 | 20 | 34 | 88 |
| 156 | 202 | 236 | 238 | 240 | 242 | 216 | 174 | 116 | 54 | 28 | 16 | 18 | 30 | 32 | 86 |
| 154 | 204 | 206 | 208 | 210 | 212 | 214 | 172 | 118 | 70 | 56 | 58 | 60 | 62 | 64 | 84 |
| 156 | 158 | 160 | 162 | 164 | 166 | 168 | 170 | 120 | 72 | 74 | 76 | 78 | 80 | 82 | 122 |

| 125 | 105 | 103 | 101 | 99 | 97 | 95 | 123 | 141 | 139 | 137 | 135 | 133 | 131 | 129 | 127 |
|---|---|---|---|---|---|---|---|---|---|---|---|---|---|---|---|
| 107 | 67 | 45 | 43 | 41 | 39 | 65 | 93 | 143 | 193 | 191 | 189 | 187 | 185 | 183 | 181 |
| 109 | 47 | 25 | 9 | 7 | 23 | 37 | 91 | 145 | 195 | 229 | 227 | 225 | 223 | 221 | 179 |
| 111 | 49 | 11 | 0 | 5 | 21 | 17 | 89 | 147 | 197 | 231 | 249 | 247 | 245 | 219 | 177 |
| 113 | 51 | 13 | 1 | 3 | 19 | 33 | 87 | 149 | 199 | 233 | 251 | 253 | 243 | 217 | 175 |
| 115 | 53 | 27 | 15 | 17 | 29 | 31 | 85 | 155 | 201 | 235 | 237 | 239 | 241 | 215 | 173 |
| 117 | 69 | 55 | 57 | 59 | 61 | 63 | 83 | 153 | 203 | 205 | 207 | 209 | 211 | 213 | 171 |
| 119 | 71 | 73 | 75 | 77 | 79 | 81 | 121 | 155 | 157 | 159 | 161 | 163 | 165 | 167 | 169 |
| 142 | 140 | 138 | 136 | 134 | 132 | 130 | 128 | 126 | 106 | 104 | 102 | 100 | 98 | 96 | 124 |
| 144 | 194 | 192 | 190 | 188 | 186 | 184 | 182 | 108 | 68 | 46 | 44 | 42 | 40 | 66 | 94 |
| 146 | 196 | 230 | 228 | 226 | 224 | 222 | 180 | 110 | 48 | 26 | 10 | 8 | 24 | 38 | 92 |
| 148 | 198 | 232 | 250 | 248 | 246 | 220 | 178 | 112 | 50 | 12 | 0 | 6 | 22 | 18 | 90 |
| 150 | 200 | 234 | 252 | 254 | 244 | 218 | 176 | 114 | 52 | 14 | 2 | 4 | 20 | 34 | 88 |
| 156 | 202 | 236 | 238 | 240 | 242 | 216 | 174 | 116 | 54 | 28 | 16 | 18 | 30 | 32 | 86 |
| 154 | 204 | 206 | 208 | 210 | 212 | 214 | 172 | 118 | 70 | 56 | 58 | 60 | 62 | 64 | 84 |
| 156 | 158 | 160 | 162 | 164 | 166 | 168 | 170 | 120 | 72 | 74 | 76 | 78 | 80 | 82 | 122 |

FIG.13B

| 122 | 156 | 158 | 160 | 162 | 164 | 166 | 168 | 170 | 120 | 72 | 74 | 76 | 78 | 80 | 82 |
|---|---|---|---|---|---|---|---|---|---|---|---|---|---|---|---|
| 127 | 125 | 105 | 103 | 101 | 99 | 97 | 95 | 123 | 141 | 139 | 137 | 135 | 133 | 131 | 129 |
| 181 | 107 | 67 | 45 | 43 | 41 | 39 | 65 | 93 | 143 | 193 | 191 | 189 | 187 | 185 | 183 |
| 179 | 109 | 47 | 25 | 9 | 7 | 23 | 37 | 91 | 145 | 195 | 229 | 227 | 225 | 223 | 221 |
| 177 | 111 | 49 | 11 | 0 | 5 | 21 | 17 | 89 | 147 | 197 | 231 | 249 | 247 | 245 | 219 |
| 175 | 113 | 51 | 13 | 1 | 3 | 19 | 33 | 87 | 149 | 199 | 233 | 251 | 253 | 243 | 217 |
| 173 | 115 | 53 | 27 | 15 | 17 | 29 | 31 | 85 | 155 | 201 | 235 | 237 | 239 | 241 | 215 |
| 171 | 117 | 69 | 55 | 57 | 59 | 61 | 63 | 83 | 153 | 203 | 205 | 207 | 209 | 211 | 213 |
| 169 | 119 | 71 | 73 | 75 | 77 | 79 | 81 | 121 | 155 | 157 | 159 | 161 | 163 | 165 | 167 |
| 124 | 142 | 140 | 138 | 136 | 134 | 132 | 130 | 128 | 126 | 106 | 104 | 102 | 100 | 98 | 96 |
| 94 | 144 | 194 | 192 | 190 | 188 | 186 | 184 | 182 | 108 | 68 | 46 | 44 | 42 | 40 | 66 |
| 92 | 146 | 196 | 230 | 228 | 226 | 224 | 222 | 180 | 110 | 48 | 26 | 10 | 8 | 24 | 38 |
| 90 | 148 | 198 | 232 | 250 | 248 | 246 | 220 | 178 | 112 | 50 | 12 | 0 | 6 | 22 | 18 |
| 88 | 150 | 200 | 234 | 252 | 254 | 244 | 218 | 176 | 114 | 52 | 14 | 2 | 4 | 20 | 34 |
| 86 | 156 | 202 | 236 | 238 | 240 | 242 | 216 | 174 | 116 | 54 | 28 | 16 | 18 | 30 | 32 |
| 84 | 154 | 204 | 206 | 208 | 210 | 212 | 214 | 172 | 118 | 70 | 56 | 58 | 60 | 62 | 64 |

RESOLUTION CONVERSION USING DITHER PROCESSING

BACKGROUND OF THE INVENTION

Field of the Invention

The present invention relates to resolution conversion processing for outputting a high-resolution image signal by a low-resolution image forming apparatus.

Description of the Related Art

In general, in image processing in an image forming apparatus, such as a printer, a copying machine, and an MFP, PDL (Page Description Language) data is developed into bitmap data within a controller of the apparatus. Then, the bitmap data is output with the same resolution as that of the developed data. For example, data that is developed with a resolution of 600 dpi is output by a printer having a printing resolution of 600 dpi.

On the other hand, a configuration in which PDL data is developed into bitmap data and then output with a resolution higher than the printing resolution of an image forming apparatus has been proposed. In this configuration, for example, PDL data is developed into 1,200-dpi bitmap data and each pixel in the developed data is output by a 600-dpi printer by using the spot multiplexing technique. With the technique to output a high-resolution image signal as high-definition image data by a low-resolution image forming apparatus, it is possible even for a printer having a low printing resolution to provide printed matter of high image quality (see Japanese Patent Laid-Open No. 2004-201283).

For example, in the technique according to Japanese Patent Laid-Open No. 2004-201283, in the case where resolution conversion is performed to convert first image data having a first resolution M into second image data having a second resolution N lower than the first resolution M, a conversion filter is used. For example, it is assumed that the resolution M is 1,200 dpi and the resolution N is 600 dpi. In this case, resolution conversion processing is performed by using a conversion filter in which a pixel of interest is arranged at every two pixels in the main and sub scan directions and a 1,200-dpi binary image is converted into a 600-dpi multivalued image. At the time of conversion, the technique according to Japanese Patent Laid-Open No. 2004-201283 does not take into consideration the position relationship between the pixel of interest in the conversion filter and the dither growth center position. Because of this, there is a case where the dot growth center point deviates from the sampling point at the time of performing resolution conversion processing on the dot growth screen. In the case where the dot growth center point deviates from the sampling point at the time of resolution conversion processing, there is a possibility that the smoothness of the change in color (gradation properties) will be lost.

SUMMARY OF THE INVENTION

The image processing apparatus according to the present invention includes a dither processing unit configured to perform dither processing on image data having a first resolution M by using a dither threshold value matrix, and a resolution conversion unit configured to perform resolution conversion to convert the image data that is generated by the dither processing unit and which has the first resolution M into image data having a second resolution N lower than the first resolution M by using a filter, and the pixel at the growth center of the dither threshold value matrix coincides with the center pixel of the processing using the filter.

According to the present invention, in the case where high-resolution image data is output by a low output resolution image forming apparatus by performing resolution conversion to convert the high-resolution image data into low-resolution image data, it is possible to obtain high-definition image data while maintaining favorable gradation properties.

Further features of the present invention will become apparent from the following description of exemplary embodiments (with reference to the attached drawings).

BRIEF DESCRIPTION OF THE DRAWINGS

FIG. 5 is a diagram showing pixel values in binary image data after dither processing;

FIG. 8 is a diagram showing pixel values in multivalued image data obtained by performing resolution conversion processing;

FIG. 9 is a diagram showing a dither threshold value matrix having 106 lines;

FIGS. 13A and 13B are diagrams explaining shift processing of a dither threshold value matrix;

DESCRIPTION OF THE EMBODIMENTS

Hereinafter, embodiments for embodying the present invention are explained by using the drawings. Configurations shown in the embodiments below are just an example and the present invention is not limited to the configurations shown schematically.

[First Embodiment]

Figure 1:
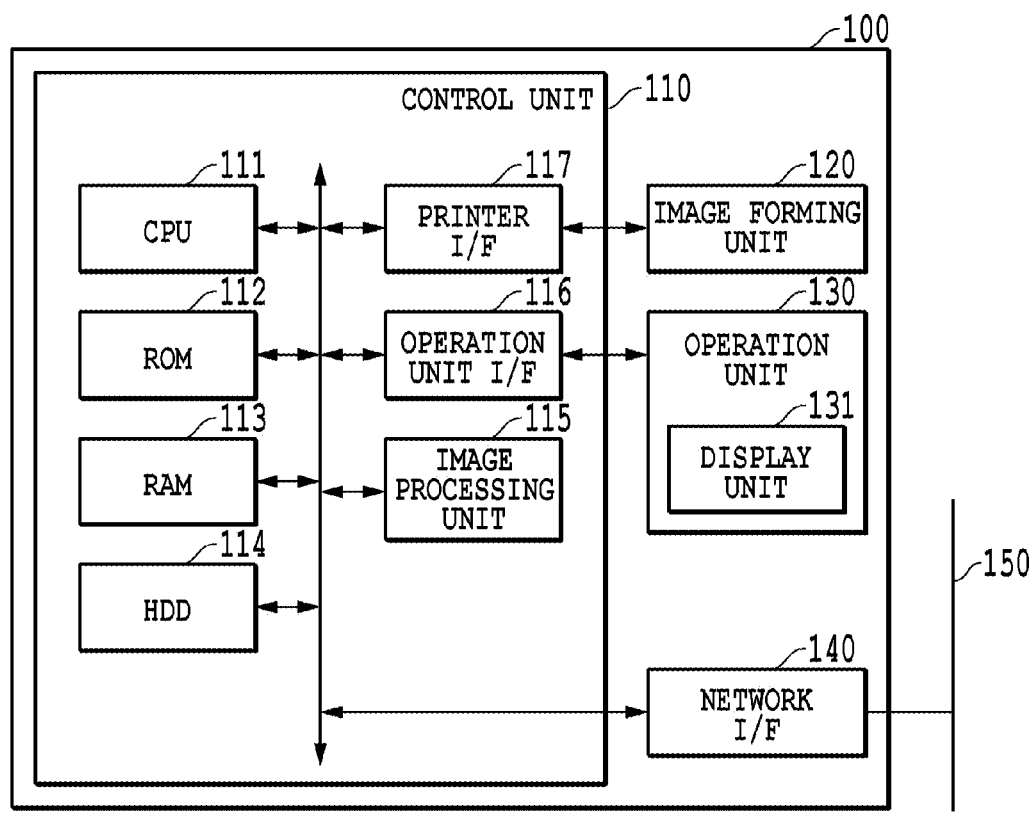
FIG. 1 is a block diagram showing main components of a printer as an image forming apparatus.

FIG. 1 is a block diagram showing main components of a printer as an image forming apparatus according to the present embodiment.

An image forming apparatus 100, which is a printer, includes a control unit 110, an image forming unit 120, an operation unit 130, and a network I/F 140.

The control unit 110 includes a CPU 111, a ROM 112, a RAM 113, an HDD 114, an image processing unit 115, an operation unit I/F 116, and a printer I/F 117.

The processor (CPU) 111 that comprehensively controls each unit reads control programs stored in the ROM 112 and performs various kinds of control processing such as printing control.

The ROM 112 stores various commands (OS, application programs, etc.) that are executed by the CPU 111.

The RAM 113 is used as a temporary storage area, such as a main memory and a work area, of the CPU 111.

The HDD 114 is a hard disk drive that is used as a storage area of various programs (image processing programs, dither threshold value matrixes, resolution conversion filters, etc.) that are read onto the RAM 113 and execution results.

The image processing unit 115 performs image processing, such as halftone processing and resolution conversion processing, on acquired image data. Details of the image processing will be described later.

The operation unit I/F 116 serves as an interface with the operation unit 130 through which a user performs various operations and gives various instructions.

The printer I/F 117 serves as an interface with the image forming unit 120.

The image forming unit 120 performs processing to form a color image on a printing medium such as paper by the electrophotographic method based on image data on which image processing has been performed.

The operation unit 130 through which a user gives instructions to perform various operations includes a keyboard and various switches, or a touch panel LCD display unit. Information that is input through the operation unit 130 is transmitted to the CPU 111 via the operation unit I/F 116 and desired processing is performed thereon, and the results of the processing etc. are displayed on a display unit 131 provided within the operation unit 130.

The network I/F 140 serves as in interface with a network 150 such as a LAN. The image forming apparatus 100 is connected with a PC etc. (not shown) on the network 150 via the network I/F 140.

The image forming apparatus 100 is not limited to a printer and may be, for example, a digital multifunction machine including the functions as a copying machine, a scanner, and a FAX.

The image forming apparatus 100 acquires image data on which processing is to be performed by a variety of methods. For example, it may also be possible for a user to generate image data on a predetermined application by operating the operation unit 130 or to acquire image data generated by a PC etc. via the network 150. In the case where a reading mechanism of storage media that can be attached and detached, such as a magnetic disc and an optical disk, is provided, it may also be possible to acquire image data via the storage medium. Further, in the case where an image reading apparatus such as a scanner is incorporated (or connected via a network), it may also be possible to acquire image data by reading a document etc. with the image reading apparatus.

In addition to the case where the control unit 110 is configured as a part of the image forming apparatus as described above, it may also be possible to configure the control unit 110 as an independent image processing apparatus and to connect the image processing apparatus with a printer that is provided separately via the network 150.

Figure 2:
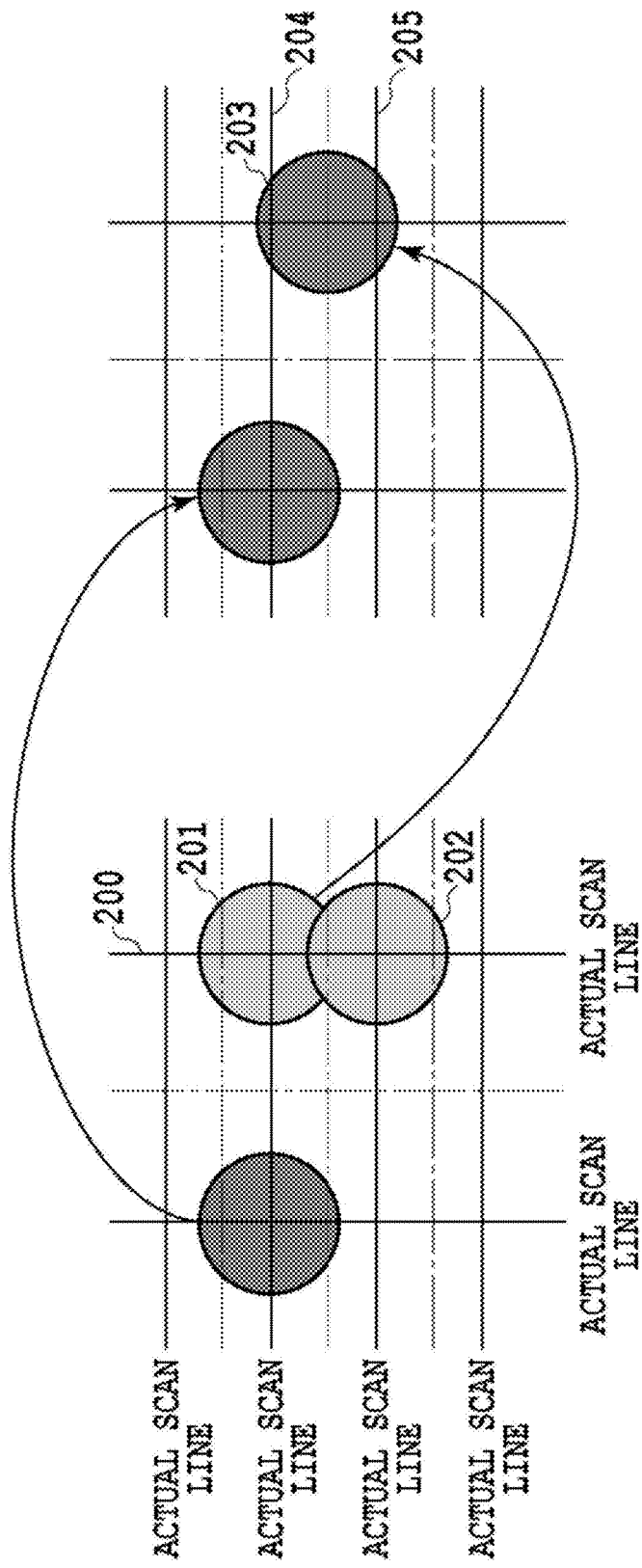
FIG. 2 is a diagram showing the principles of formation of a sub dot between dots by superimposition of laser exposure.

FIG. 2 is a diagram showing the principles of formation of a sub dot between dots by superimposition of laser exposure. By superimposing the exposure of a half dot on two pixels 201 and 202 that are arranged vertically on an actual scan line 200 indicated by the solid line, a sub dot 203 is formed between an actual scan line 204 and an actual scan line 205. The present invention utilizes the principles.

In the present embodiment, it is assumed that a first resolution M before resolution conversion is 1,200 dpi, a second resolution N after resolution conversion is 600 dpi, image data having the first resolution M is referred to as first image data, and image data having the second resolution N is referred to as second image data. Further, it is also assumed that the first image data before resolution conversion is binary halftone image data on which dither processing has been performed, and the number of screen lines at the time of dither processing is 106. Then, the second image data after resolution conversion is assumed to be 8-bit multivalued image data.

Figure 3:
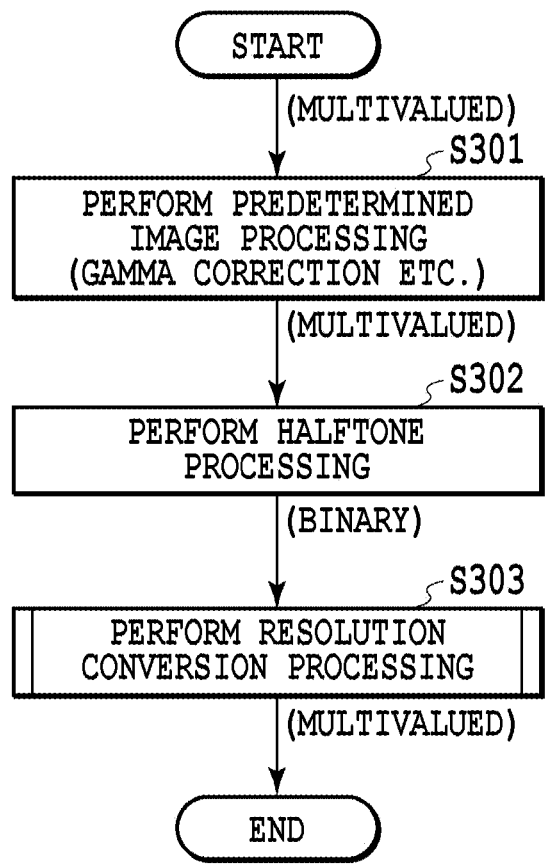
FIG. 3 is a flowchart showing a flow of processing in an image processing unit according to a first embodiment.

FIG. 3 is a flowchart showing a flow of processing in the image processing unit 115 according to the present embodiment. The contents that will be described below are implemented by the CPU 111 reading programs stored in the HDD 114 etc. onto the RAM 113 and executing the programs.

After 1,200-dpi multivalued image data, which is a target of processing, is input to the image processing unit 115, the image processing unit 115 performs predetermined image processing, such as density adjustment and gamma correction, on the multivalued image data at step 301. It is assumed that the multivalued image data, which is input image data, has 256 gradations.

Figure 4:
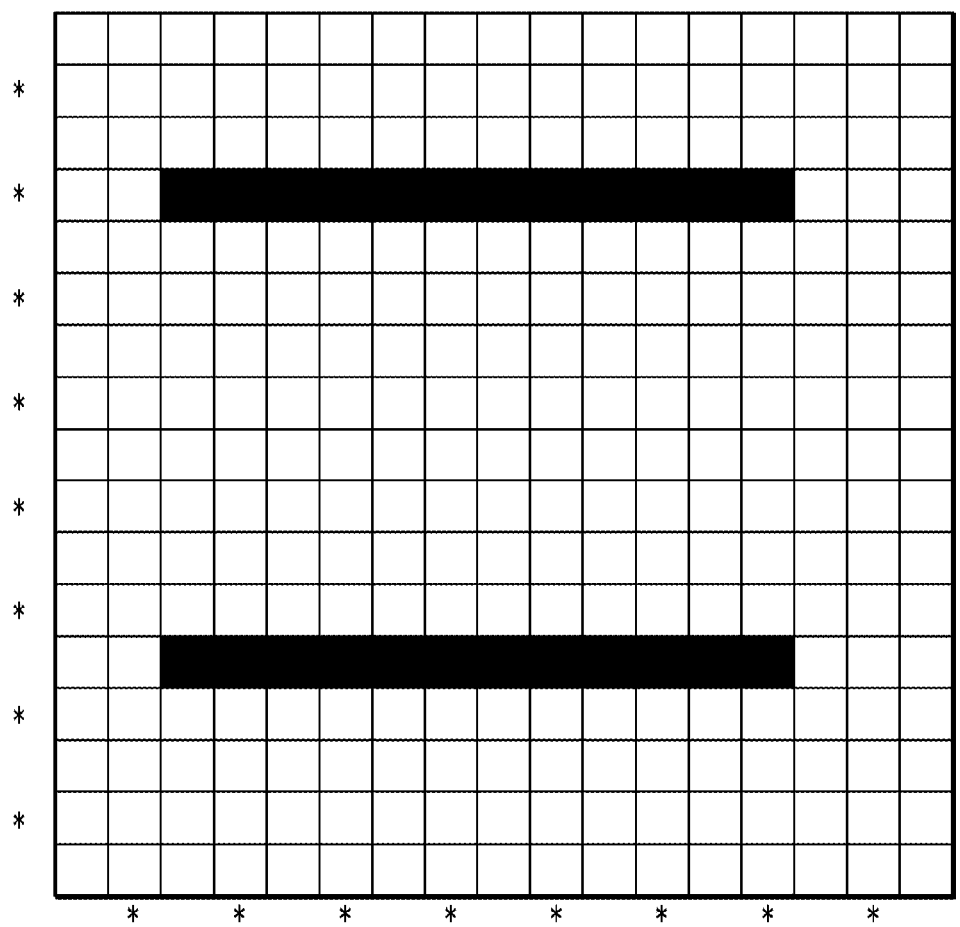
FIG. 4 is a diagram showing an example (partially enlarged) of a binary image generated by dither processing.

At step 302, the image processing unit 115 performs halftone processing (dither processing) by the dither method using a predetermined dither pattern on the multivalued image data on which gamma correction etc. has been performed to convert the multivalued image data into binary halftone image data. The predetermined dither pattern (dither threshold value matrix) that is used here is generated by processing to adjust the position relationship between the dot growth center point and the sampling point in the resolution conversion processing, which will be described later, and is stored in a storage unit such as the RAM 113. FIG. 4 is a diagram showing an example of a binary image generated by dither processing, part of which being enlarged. In FIG. 4, each cell corresponds to a pixel and a black cell indicates an on-dot pixel and a white cell indicates an off-dot pixel. An asterisk indicates a column or a row in which the sampling point in the resolution conversion processing (hereinafter, the sampling point at the time of conversion) exists. Here, the dither processing is explained as processing to convert multivalued image data into binary image data, but the dither processing may be processing to convert multivalued image data into three-valued or four-valued image data.

At step 303, the image processing unit 115 generates multivalued image data having the second resolution N by performing the resolution conversion processing by using a conversion filter on the halftone image data having the first resolution M obtained by the dither processing. The size of the conversion filter that is used is determined in accordance with a scaling ratio of N/M. In the case of the present embodiment in which 1,200-dpi binary image data is converted into 600-dpi multivalued image data, a conversion filter having a size in accordance with the scaling ratio N/M=1/2 is used. Details of the resolution conversion processing will be described later.

Then, the multivalued image data obtained by the resolution conversion processing is sent to the image forming unit 120 and printing processing is performed thereon after image processing in accordance with necessity is performed.

Next, the resolution conversion processing at step 303 is explained in detail.

Figure 6:
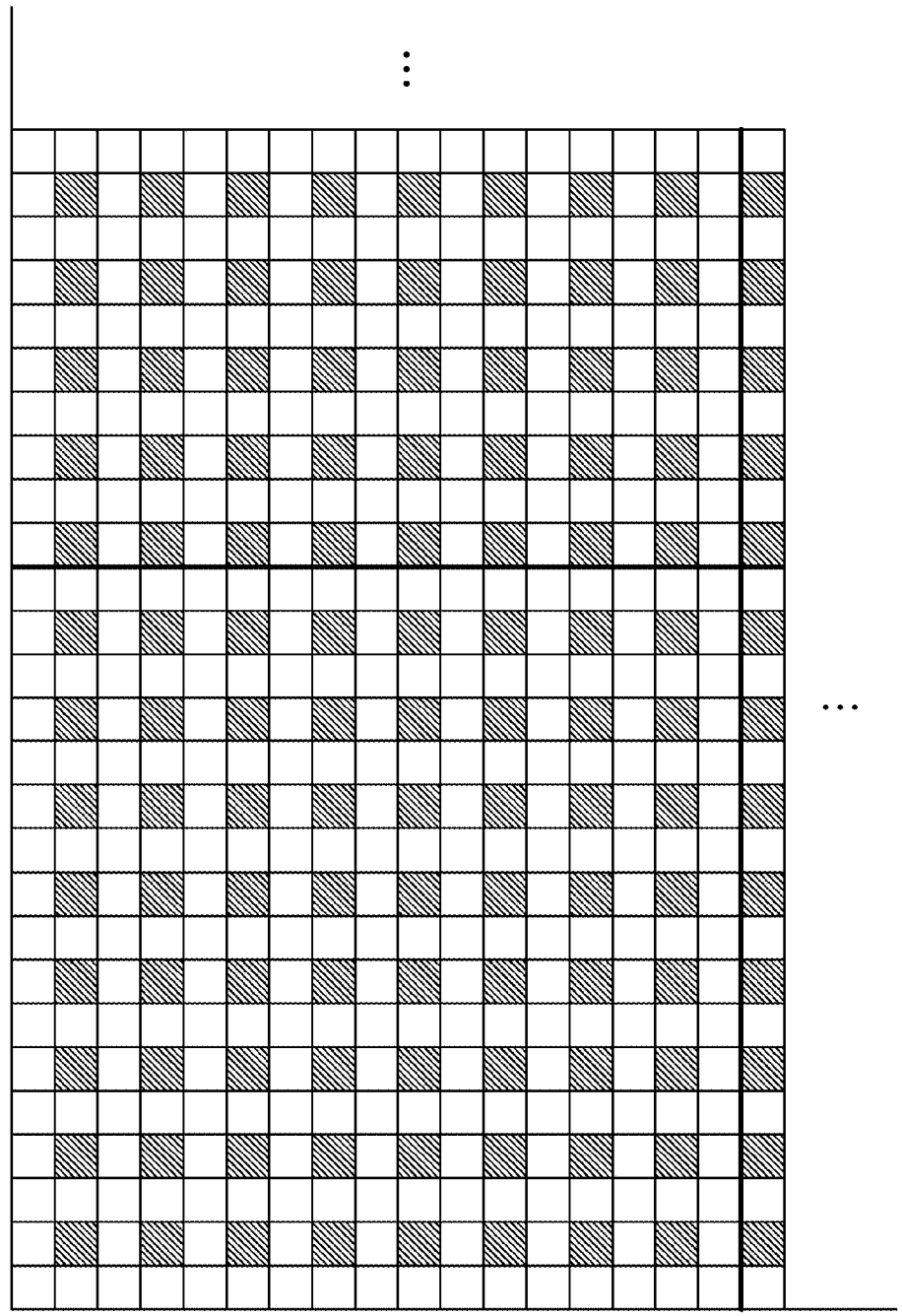
FIG. 6 is a diagram showing positions of sampling points at the time of conversion.
Figure 7:
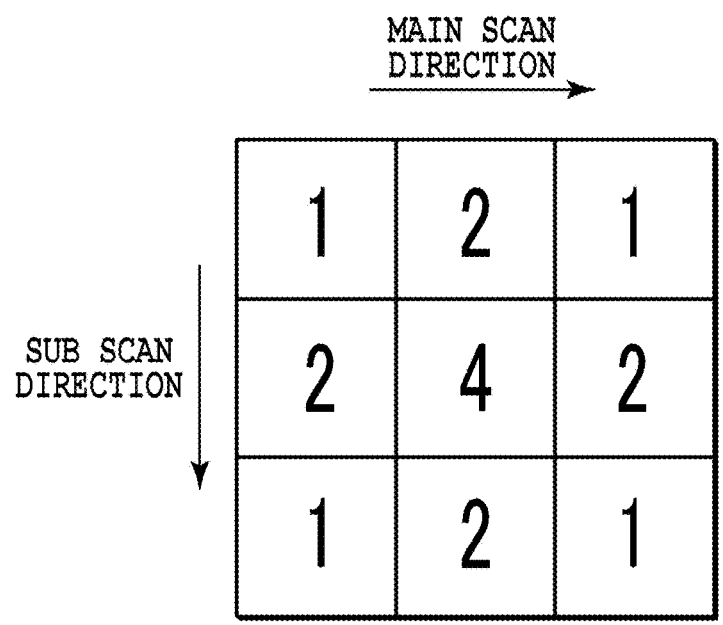
FIG. 7 is a diagram showing an example of a resolution conversion filter.

In the present embodiment, the halftone image data after the dither processing, which is the target of the resolution conversion processing, is binary image data as described above. FIG. 5 is a diagram showing pixel values in the binary image data after the dither processing shown in FIG. 4 and "1" is input in the black pixels in FIG. 4 and "0" is input in the white pixels. The black pixel is represented by "1" and the white pixel by "0" as described above, and a product-sum operation is performed by using a predetermined resolution conversion filter, with a pixel that exists on the sampling point at the time of conversion being taken to be a pixel of interest. FIG. 6 is a diagram showing positions of the sampling point at the time of conversion for the binary image data in FIG. 4 and FIG. 5. In FIG. 6, each cell shown in gray indicates the sampling point at the time of conversion. By the resolution conversion from 1,200 dpi into 600 dpi, the resolution is halved in each of the main scan and sub scan directions, and therefore, the sampling point at the time of conversion exists at every two pixels. FIG. 7 is a diagram showing an example of a resolution conversion filter.

An operation result OUT, which is obtained in the case were the resolution conversion filter shown in FIG. 7 is applied by taking a value of a pixel of interest in the binary image data after the dither processing to be x (i, j), will be as expressed by expression (1) below.

$$OUT=x(i,j)*4+(x(i,j-1)+x(i,j+1)+x(i-1,j)+x(i+1,j))*2+ (x(i-1,j-1)+x(i+1,j-1)+x(i-1,j+1)+x(i+1,j+1)) \quad \text{expression (1)}$$

An output value is obtained by clipping the operation result into an 8-bit output (maximum value is 255) in a ratio of the total sum of filter coefficients. In this manner, the resolution conversion processing is performed on the binary image data after the dither processing. FIG. 8 shows pixel values in the multivalued image data obtained by performing the above-described resolution conversion processing on the binary image data shown in FIG. 4. As shown in FIG. 8, the pixel values in a portion 801 corresponding to the portion where the positions of the sampling points at the time of conversion and the positions of the black pixels coincide with each other are different from those in a portion 802 corresponding to the portion where the positions of the sampling points at the time of conversion and the positions of the black pixels do not coincide with each other.

Here, a position relationship between the phase of the dot growth center point in the dither processing (dither growth center point) and the phase of the sampling point in the resolution conversion processing is explained.

Figure 10:
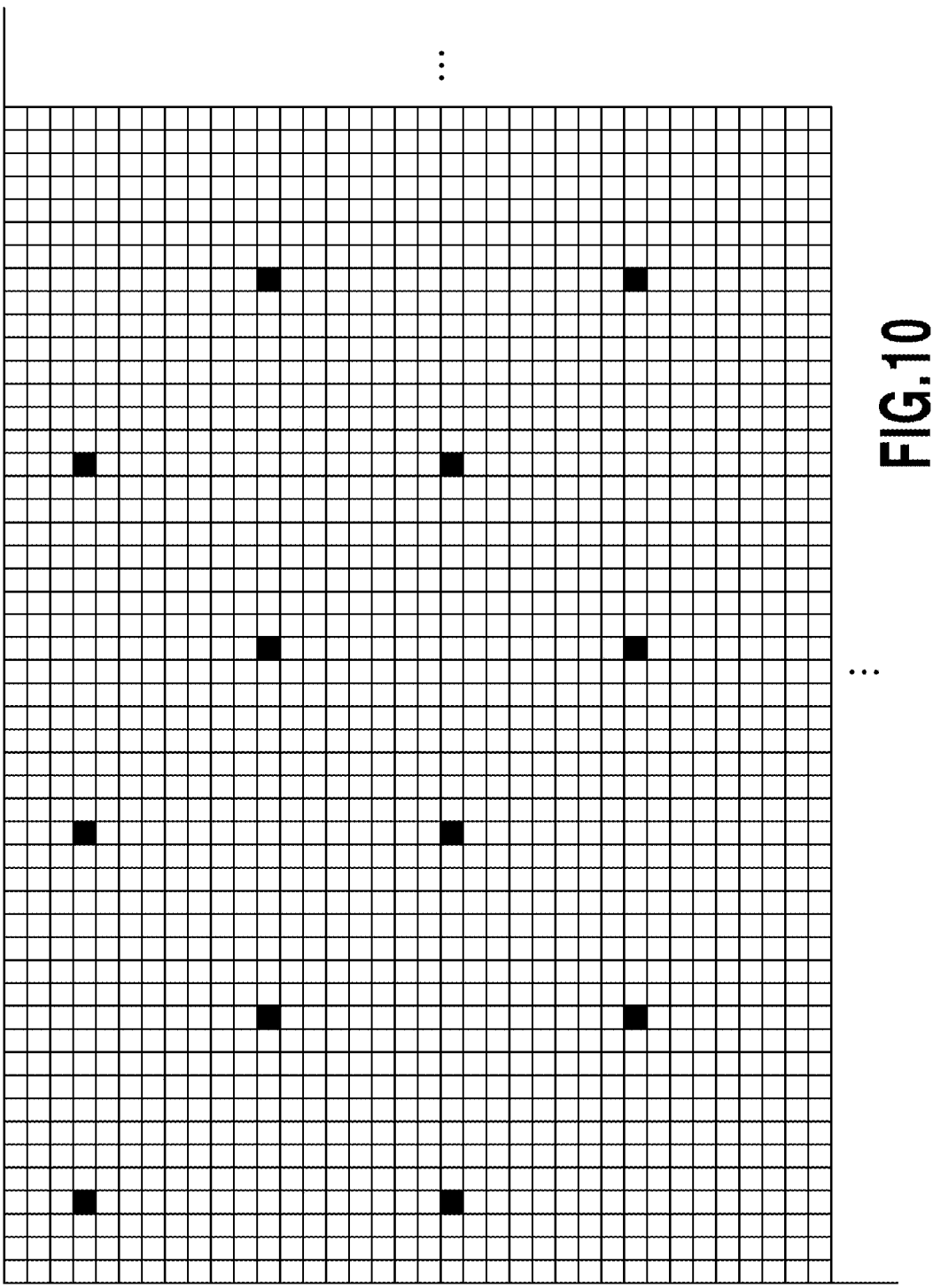
FIG. 10 is a diagram showing dither growth center points within a 1,200-dpi dither threshold value matrix having 106 lines.

FIG. 9 is a diagram showing an example of a dither threshold value matrix whose number of lines is 106, which is used in the dither processing at step 302 described previously. The position of "0" (portion surrounded by a thick line) in the dither threshold value matrix indicates the dither growth center point. In the 1,200-dpi dither threshold value matrix having 106 lines, the distance between the dither growth center points in the main scan direction and that in the sub scan direction are both eight pixels. The distance between the dither growth center points is determined uniquely by the number of lines and the resolution. Then, in the case where the dither origin at the time of performing the dither processing on input multivalued image data is determined, the coordinates of the dither growth center point are also determined uniquely. In the case where the coordinates of the dither origin are assumed to be (0, 0) located in the top-left corner of the page, a dither growth center point 901 within the dither threshold value matrix shown in FIG. 9 is located at coordinates (3, 3) and another dither growth center point 902 is located at coordinates (11, 11). Then, in the entire page, the dither growth center point appears periodically at eight-pixel intervals both in the main scan direction and in the sub scan direction. FIG. 10 is a diagram showing the dither growth center points within the 1,200-dpi dither threshold value matrix having 106 lines. The portions pained solid in black indicate the dither growth center points that appear periodically at eight-pixel intervals.

Subsequently, the sampling point at the time of resolution conversion processing after the dither processing is focused on. In the case of the present embodiment in which the resolution is converted from 1,200 dpi into 600 dpi, as described above, the sampling point at the time of conversion exists at every two pixels both in the main scan direction and in the sub scan direction. By taking this into consideration, the dither threshold value matrix is changed so that the phase of the above-described dither growth center point coincides with the phase of the sampling point at the time of conversion.

FIGS. 11A to 11D are diagrams each showing a relationship of positions at which the sampling point at the time of conversion and the dither growth center point can be located on the binary image data. In FIGS. 11A to 11D, the portion indicated by slashes is the sampling point at the time of conversion and the portion indicated in black is the dither growth center point. It is known that, in FIG. 11A, the phase of the sampling point at the time of conversion and the phase of the dither growth center point coincide with each other and the positions thereof overlap with each other, but in FIGS. 11B to 11D, the phase of the sampling point at the time of conversion and the phase of the dither growth center point do not coincide with each other and the positions thereof deviate from each other.

Here, a problem in the case where resolution conversion is performed without causing the phase of the dither growth center point and the phase of the sampling point at the time of conversion to coincide with each other is explained.

Figure 11A:
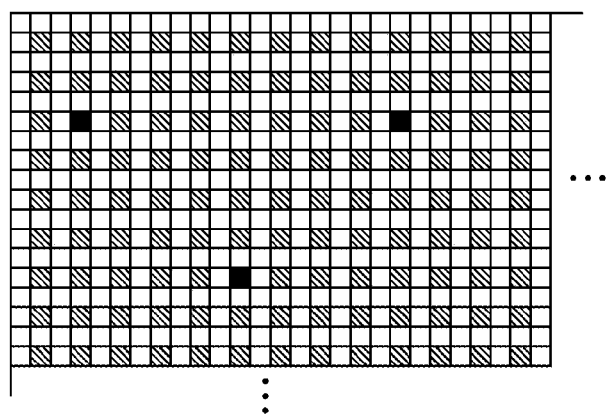
FIGS. 11A to 11D are diagrams showing a relationship between positions in which the sampling points at the time of conversion and the dither growth center points can be located on binary image data.

For example, in the second image data that is obtained by performing the resolution conversion processing in the state where both the phases coincide with each other as shown in FIG. 11A, the values of pixels adjacent to the pixel corresponding to the dither growth center point increase stepwise with the value of the pixel corresponding to the dither growth center point as a center. In other words, in the electrophotographic method, this means that an aggregation of charges is formed stepwise with the dither growth center point as a center. Then, the amount of charges is in proportion to the amount of exposure of laser exposure light.

Figure 11B:
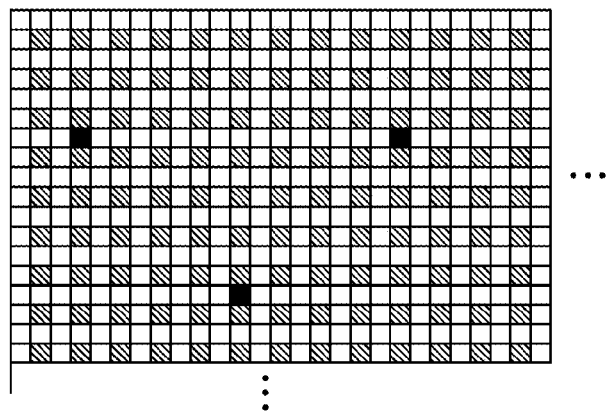
Figure 11C:
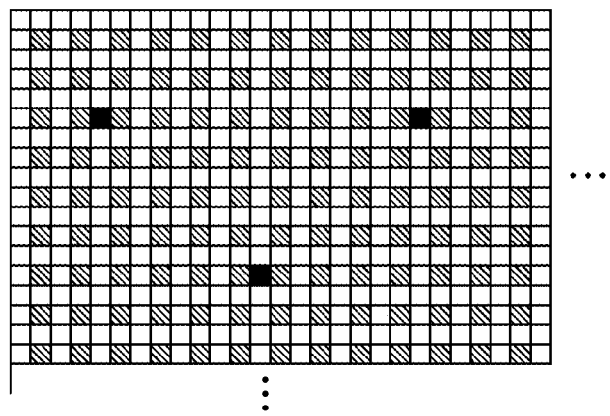
Figure 11D:
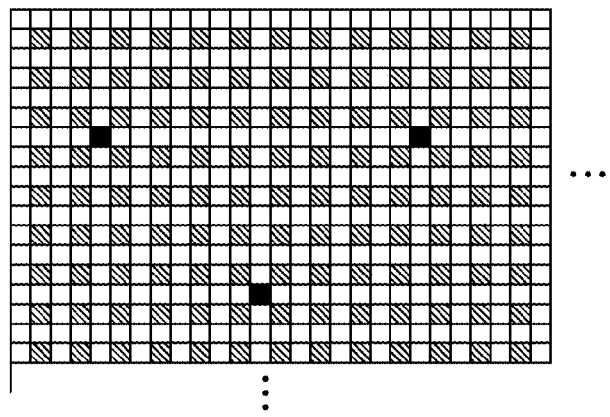

On the other hand, in the second image data that is obtained by performing the resolution conversion processing in the state where both the phases do not coincide with each other as shown in FIG. 11D, the values of the four pixels adjacent to the dither growth center increase first, and then, small values spread to the pixels adjacent to the four pixels. In other words, in the electrophotographic method, this means that the four points adjacent to the dither growth center grow first and charges accumulate widely and thinly on the points adjacent to the four points. In the case where the pixel value is regarded as the amount of exposure of laser exposure light, an increase in the number of small values, such as a pixel value of 1, is unlikely to be reflected in the density of output matter. In other words, there exit density areas where the density of output matter is unlikely to become high even in the case where the pixel value of multivalued image data increases. This means that favorable gradation properties are not obtained (a contrast of shade is hard to obtain).

Consequently, in the present embodiment, in the case of FIGS. 11B to 11D described above, the dither threshold value matrix is redesigned so that the phase of the sampling point at the time of conversion and the phase of the dither growth center point coincide with each other in order to obtain favorable gradation properties ultimately.

Figure 12:
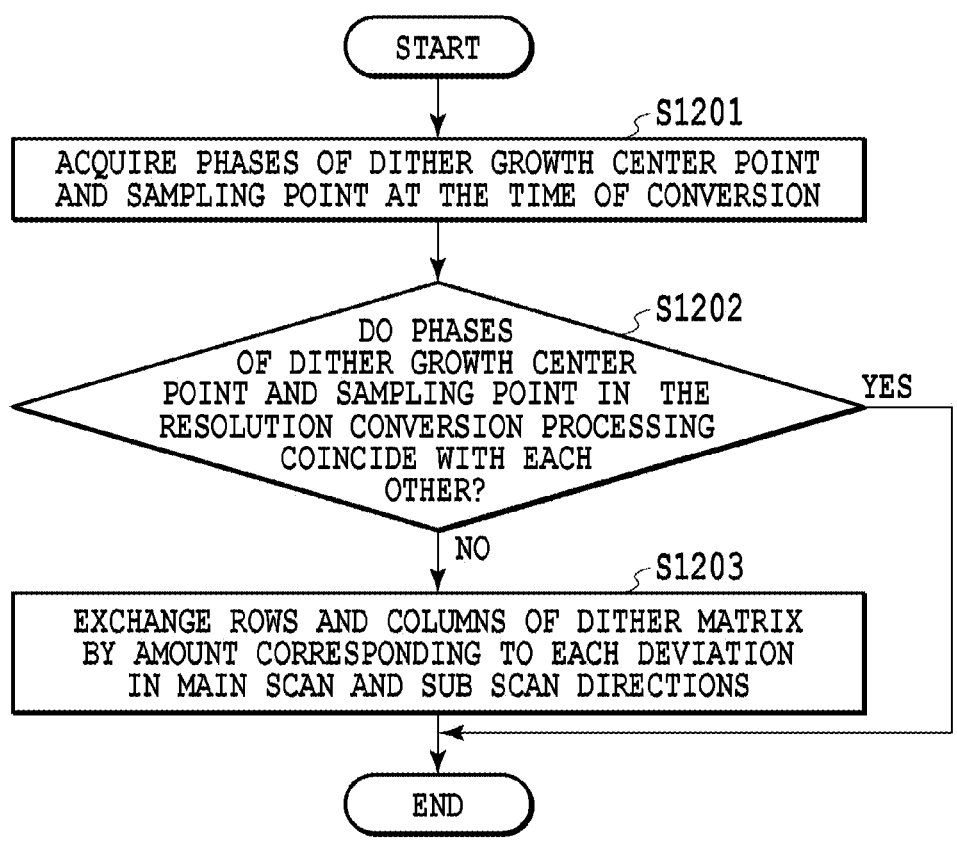
FIG. 12 is a flowchart showing a flow of phase adjustment processing.

FIG. 12 is a flowchart showing a flow of processing (phase adjustment processing) to adjust the position relationship between the dither growth center point and the sampling point at the time of conversion. The contents that will be described below are implemented by the CPU 111 reading programs stored in the HDD 114 etc. onto the RAM 113 and executing the programs. This processing is performed prior to the previously-described image processing (in the flowchart in FIG. 3) in the image processing unit 115.

At step 1201, the image processing unit 115 acquires the phase of the dither growth center point and the phase of the sampling point at the time of conversion in the initial design stage.

At step 1202, the image processing unit 115 determines whether the acquired phase of the dither growth center point and the acquired phase of the sampling point at the time of conversion coincide with each other. In the case where both the phases coincide with each other, the present processing is exited. On the other hand, in the case where both the phases do not coincide with each other, the processing proceeds to step 1203.

At step 1203, the image processing unit 115 exchanges rows and/or columns of the dither threshold value matrix in accordance with a deviation between the phase of the dither growth center point and the phase of the sampling point at the time of conversion. Here, the exchange processing (shift processing) of rows/columns of the dither threshold value matrix in accordance with a deviation is explained in detail with reference to the drawings.

It is assumed that the dither threshold value matrix shown in FIG. 9 described previously is the dither threshold value matrix in the initial design stage and the position relationship between the dither growth center points 901/902 indicated by the thick-line rectangles in FIG. 9 and the sampling points at the time of conversion is the position relationship shown in FIG. 11D describe previously. In this case, the dither growth center points 901/902 deviate from the sampling points at the time of conversion by one pixel, respectively, both in the main scan direction and in the sub scan direction. In this case, the row and the column of the dither threshold value matrix are shifted, respectively, as shown in FIG. 13A. FIG. 13B shows the dither threshold value matrix after the shift processing and it is known that the sixteenth row (156, 158, . . . , 82, 122) before the shift processing has moved and become the uppermost row and the sixteenth column before the shift processing (127, 181, . . . , 84, 122) has moved and become the leftmost column. Due to this, it is possible to cause the phase of the dither growth center point and the phase of the sampling point at the time of conversion to coincide with each other. Similarly, in the case where the position relationship between the dither growth center points and the sampling points at the time of conversion is the position relationship shown in FIG. 11B described previously (in the case where a deviation occurs only in the sub scan direction), it is sufficient to shift only the row. In the case where the position relationship is the position relationship shown in FIG. 11C described previously (in the case where a deviation occurs only in the sub scan direction), it is sufficient to shift only the column. The dither threshold value matrix in the initial design stage (the dither threshold value matrix before the shift processing) is replaced with the dither threshold value matrix (the dither threshold value matrix after the shift processing) in which one of or both the row and the column have been shifted in accordance with a deviation as described above, and thus, the former is overwritten by and updated to the latter.

The above is the contents of the phase adjustment processing. Due to this, the dither processing using the dither threshold value matrix having the sampling points whose phase coincide with that of the dither growth center points is performed in the flow in FIG. 3 described previously.

There is a case where dither threshold value matrixes having different numbers of screen lines are used within one image. For example, there is a case where there are attributes, such as characters and images, for each object within an image and the number of lines is switched to another for each attribute. In this case, it is sufficient to redesign the dither threshold value matrix described above for each kind of dither so as to cause the phase of the dither growth center point and the phase of the sampling point at the time of conversion to coincide with each other.

As described above, according to the present embodiment, the dither threshold value matrix is redesigned prior to the resolution conversion into image data having a lower resolution and the resolution conversion processing is performed in the state where the phase of the dither growth center point and the phase of the sampling point at the time of conversion are caused to coincide with each other. Due to this, it is possible to obtain a high-resolution output image from a low output resolution engine while maintaining the gradation properties thereof.

In the present embodiment, the dither threshold value matrix is redesigned in order to cause the phase of the dither growth center point and the phase of the sampling point at the time of conversion to coincide with each other, but it may also be possible to change the phase of the sampling point at the time of conversion without performing the exchange processing of the rows/columns of the dither threshold value matrix.

[Second Embodiment]

In the first embodiment, the aspect is explained in which the phase of the dither growth center point and the phase of the sampling point at the time of conversion are caused to coincide with each other and then the dither processing and the resolution conversion processing that follows are performed. Next, an aspect in which rotation processing of an image is interposed between the dither processing and the resolution conversion processing is explained as a second embodiment. Explanation of contents in common to those of the first embodiment is omitted and in the following, points different from those of the first embodiment are explained mainly.

In the present embodiment, explanation is given by using the case as an example where after the dither processing is performed on the first image data (multivalued) having a resolution of 1,200 dpi to convert the first image data into binary image data having a resolution of 1,200 dpi, rotation processing is performed, and then, the resolution conversion processing into the second image data having a resolution of 600 dpi is performed. It is assumed that the number of screen lines at the time of dither processing is 106.

Figure 14:
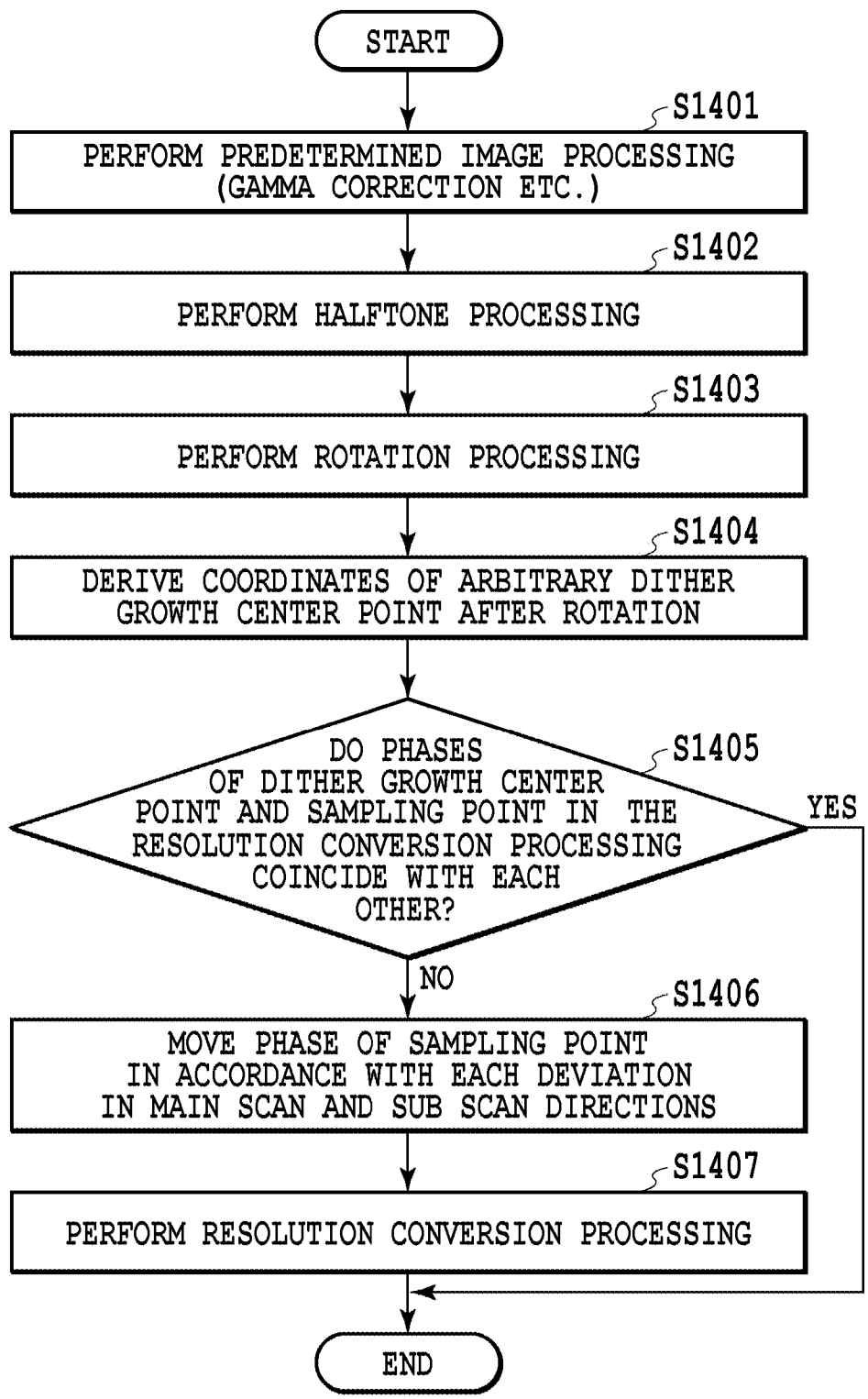
FIG. 14 is a flowchart showing a flow of processing in an image processing unit according to a second embodiment.

FIG. 14 is a flowchart showing a flow of processing in the image processing unit 115 according to the present embodiment.

After 1,200-dpi multivalued image data, which is a target of the processing, is input to the image processing unit 115, at step 1401, the image processing unit 115 performs predetermined image processing, such as density adjustment and gamma correction, on the multivalued image data.

At step 1402, the image processing unit 115 performs halftone processing (dither processing) using a predetermined dither pattern on the multivalued image data on which gamma correction etc. has been performed and converts the multivalued image data into binary image data. The dither pattern (dither threshold value matrix) that is used here is a dither pattern for which adjustment has been made so that the phase of the dither growth center point and the phase of the sampling point in the resolution conversion processing coincide with each other as described in the first embodiment.

At step 1403, the image processing unit 115 performs rotation processing to rotate an image through arbitrary angles on the binary image data obtained by the dither processing.

At step 1404, the image processing unit 115 derives coordinates of an arbitrary dither growth center point (reference point) after the rotation processing in the binary image data before the rotation processing is performed based on the size of the image and the rotation angle in the rotation processing. Here, explanation is given by using a specific example. As described above, at the point of time of performing the dither processing on the multivalued image data, the phase of the dither growth center point and the phase of the sampling point at the time of conversion are in agreement with each other (see FIG. 11A). Because of this, by focusing on an arbitrary dither growth center point, the position of the dither growth center point after the rotation is found by calculation. Here, explanation is given by using the case where the dither growth center point located at the position of coordinates (3, 3) on the binary image data is focused on as an example. The sampling point at the time of conversion includes the coordinates (3, 3) and exists at every two pixels in the main scan direction and in the sub scan direction, respectively. In this case, it is assumed that the image size of the first image data on which the dither processing has been performed is, for example, 4,700×6,700 and the coordinates of the origin of the image are (0, 0). Then, the coordinates of the end point will be (4,699, 6,699). In the case where the first image data such as this is rotated to the left through 90 degrees, the image size after the rotation will be 6,700×4,700, and therefore, the dither growth center point that was located at the coordinates (3, 3) before the rotation will be located at the coordinates (3, 4,696) after the rotation.

At step 1405, the image processing unit 115 determines whether the phase of the dither growth center point and the phase of the sampling point at the time of conversion coincide with each other in the image after the rotation processing. For example, the image processing unit 115 determines whether the dither growth center point and the position of the sampling point at the time of conversion overlap with each other in the case there the sampling point at the time of conversion is caused to exist so as to include the coordinates (3, 3), as in the image data before the rotation processing, in the image that has been rotated to the left through 90 degrees. In the case of the above-described specific example, the coordinates (3, 4,696) of the dither growth center point after the rotation are not included in the sampling point at the time of conversion, and therefore, the phase of the dither growth center point and the phase of the sampling point at the time of conversion do not coincide with each other. In the case where it is determined that the phase of the dither growth center point in the image after the rotation processing and the phase of the sampling point at the time of conversion in the image after the rotation processing coincide with each other, the processing proceeds to step 1407. On the other hand, in the case where it is determined that both the phases do not coincide with each other, the processing proceeds to step 1406.

At step 1406, the image processing unit 115 moves the phase of the sampling point at the time of conversion from that in the initial setting by the amount corresponding to the deviation between the dither growth center point in the image after the rotation processing and the sampling point at the time of conversion in the image after the rotation processing. In the case of the above-described specific example, the phase of the sampling point at the time of conversion is moved by the amount corresponding to one pixel in the sub scan direction so as to include the coordinates (3, 4,696). In this manner, the phase of the dither growth center point and the phase of the sampling point at the time of conversion are caused to coincide with each other.

At step 1407, the image processing unit 115 performs the same resolution conversion processing as that in the first embodiment on the 1,200-dpi binary image data after the rotation processing and generates the 600-dpi multivalued image data.

The above is the contents of the processing in the image processing unit 115 in the case where the rotation processing of an image is interposed between the dither processing and the resolution conversion processing according to the present embodiment.

As described above, according to the present embodiment, before the resolution conversion processing is performed, the phase of the dither growth center point and the phase of the sampling point are checked again and in the case where both the phases do not coincide with each other, after both the phases are caused to coincide with each other, the resolution conversion processing is performed. Due to this, it is possible to obtain a high-resolution output image from a low output resolution engine while maintaining the gradation properties thereof, as in the first embodiment.

[Third Embodiment]

The first and second embodiments suppose the configuration in which the image processing unit 115 of the image forming apparatus 100 performs all the processing, i.e., the general image processing (gamma correction etc.), the halftone processing (dither processing), and the resolution conversion processing, on the multivalued image data. Next, an aspect is explained as a third embodiment, in which part of the functions of the image processing unit 115 are performed by software within a computer that is connected with an image forming apparatus via a network etc. depending on the kind of PDL and the setting of a printer driver. Explanation of the contents in common to those of the first embodiment is omitted and in the following, different points are explained mainly.

Figure 15:
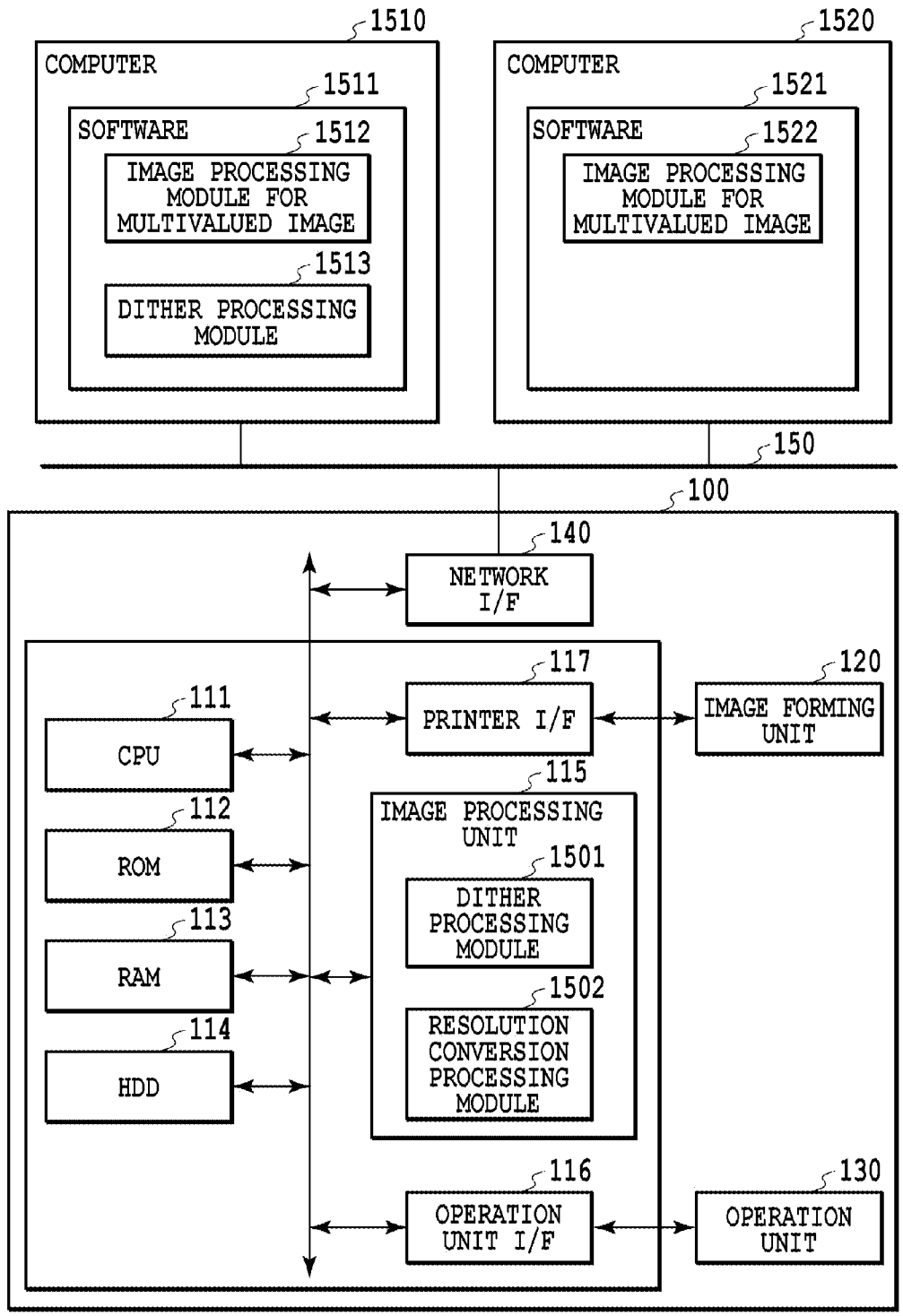
FIG. 15 is a block diagram showing main components of an image forming apparatus and software according to a third embodiment.

FIG. 15 is a block diagram showing main components of a printer as an image forming apparatus and a computer (hereinafter, PC) that is connected via a network according to the present embodiment.

The image forming apparatus 100 includes the control unit 110, the image forming unit 120, the operation unit 130, and the network I/F 140 as shown in the block diagram (FIG.

1) of the first embodiment. However, the internal configuration of the image processing unit 115 in the present embodiment differs from that of the first embodiment, and includes a dither processing module 1501 and a resolution conversion processing module 1502 but does not have the function to perform the predetermined image processing such as the gamma correction on a multivalued image (processing corresponding to that at step 301 in FIG. 3).

The dither processing module 1501 is a processing module that performs dither processing on a multivalued image and is in charge of the processing corresponding to that at step 302 in FIG. 3 in the first embodiment.

The resolution conversion processing module 1502 is a processing module that performs resolution conversion processing on a halftone image on which dither processing has been performed and is in charge of the processing corresponding to that at step 303 in FIG. 3 in the first embodiment.

PCs 1510 and 1520 are information processing apparatuses that are connected with the image forming apparatus 100 via the network 150. The computers 1510 and 1520 are equipped with software 1511 and software 1521 as printer drivers, respectively, and give instructions to print image data to the image forming apparatus 100. The software 1511 has a processing module 1512 in charge of predetermined image processing (processing corresponding to that at step 301 in FIG. 3) for a multivalued image and a processing module 1513 in charge of dither processing (processing corresponding to that at step 302 in FIG. 3). The software 1521 has a configuration having only a processing module 1522 in charge of predetermined image processing for a multivalued image.

As described above, in the present embodiment, the PCs 1510 and 1520 have different software and suppose print jobs in which dither processing is performed in different portions (in the case of the PC 1510, dither processing is performed by the PC and in the case of the PC 1520, dither processing is performed by the image forming apparatus, respectively). In other words, in a case (case 1) where a print job is sent from the PC 1510, dither processing is performed by the dither processing module 1513 within the software 1511 and the generated halftone image data is transmitted to the image forming apparatus 100 via the network 150. Then, the resolution conversion processing is performed by the resolution conversion processing module 1502 within the image processing unit 115 of the image forming apparatus 100. In a case (case 2) where a print job is sent from the PC 1520, multivalued image data on which predetermined image processing has been performed within the software 1521 is transmitted to the image forming apparatus 100 via the network 150. Then, the generated halftone image data on which dither processing has been performed by the dither processing module 1501 within the image processing unit 115 of the image forming apparatus 100 is subjected to the resolution conversion processing in the resolution conversion processing module 1502.

Then, for example, in the case 1, on a condition that the dither phase of the dither processing module 1513 and the dither phase of the dither processing module 1501 are different from each other, the phase of at least one of the dither processing module 1513 and the dither processing module 1501 does not coincide with the phase of the sampling point at the time of conversion in the resolution conversion processing module 1502. As a result of this, printing and outputting the same image will result in output matter having different gradation/density characteristics.

Because of this, in the present embodiment, the phase of the dither growth center point and the phase of the sampling point at the time of conversion are caused to coincide with each other as follows.

First, in the above-described case 2, on a condition that the phase of the dither growth center point in the dither processing module 1501 and the phase of the sampling point at the time of conversion in the resolution conversion processing module 1502 do not coincide with each other, it is sufficient to apply the first embodiment as it is. In other words, it is sufficient to redesign the dither threshold value matrix that is used in the dither processing module 1501 in the image processing unit 115 as described previously. Due to this, it is possible to cause the phase of the dither growth center point according to the print job that is transmitted by the PC 1520 and the phase of the sampling point at the time of conversion to coincide with each other.

Next, the above-described case 1 is explained.

The image data included in the print job that is transmitted to the image forming apparatus 100 by the PC 1510 is image data on which dither processing has already been performed. In this case, the image processing unit 115 first determines whether the phase of the dither growth center point included in the received image data and the phase of the sampling point at the time of conversion in the resolution conversion processing module 1502 coincide with each other. It may also be possible to perform the determination processing, for example, based on information on the phase of the dither growth center point by embedding the information in advance within the print job that is transmitted from the PC1510. In this case, the phase information includes dither origin information indicative of the origin based on which the dither processing module 1513 performs dither processing on image data, and dither growth center point position information in the dither threshold value matrix. Then, in the case where it is determined that both the phases do not coincide with each other, the amounts of deviation of the phase in the main scan and sub scan directions are calculated and the phase of the sampling point at the time of conversion possessed by the resolution conversion processing module 1502 is moved by the amount corresponding to the amount of deviation. In the case where determination is performed by using the above-described phase information, it is sufficient to perform adjustment so that the sampling point at the time of conversion coincides with the dither growth center point coordinates in the image processing unit 115 based on the dither origin information and the dither growth center point position information. Specifically, in the case of the resolution conversion processing using a resolution conversion filter having, for example, the cycle of the sampling point at the time of conversion shown in FIG. 6 described previously and having a size of 3×3 shown in FIG. 7 described previously, it is sufficient to give a degree of freedom by moving the sampling point at the time of conversion (by shifting the start point) by an amount corresponding to one pixel each time in the main scan and the sub scan directions, respectively.

By performing the phase adjustment processing as described above, it is possible to obtain a high-resolution output image from a low output resolution engine while maintaining the gradation properties thereof as in the first embodiment even in the case where printing of a print job of image data on which processing such as gamma correction, or dither processing has already been performed.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-043851, filed Mar. 6, 2014, and No. 2014-251850, filed Dec. 12, 2014, which are hereby incorporated by reference wherein in their entirety.

What is claimed is:

1. An image processing apparatus comprising:
a memory storing instructions; and
one or more processors which execute the instructions and cause the image processing apparatus to:
perform dither processing on image data having a first resolution M by using a dither threshold value matrix;
perform rotation processing on the image data that is generated by the dither processing unit and which has the first resolution M; and
perform resolution conversion to convert the image data that is generated by the dither processing unit and which has the first resolution M into image data having a second resolution N lower than the first resolution M by using a filter, wherein the pixel of a growth center of the dither threshold value matrix and a center pixel in the processing using the filter coincide with each other; and
derive coordinates of an arbitrary dither processing growth center point in the image on which the rotation processing has been performed, wherein in the case where the phase of the arbitrary dither processing growth center point and the phase of the center of the filter do not coincide with each other, the phase of the center of the filter is moved so as to coincide with the phase of the arbitrary dither processing growth center point based on the derived coordinates, and the resolution conversion is performed in accordance with the center of the filter after the phase thereof is moved so as to coincide with the phase of the growth center point.

2. The image processing apparatus according to claim 1, wherein
the filter is a filter having a size in accordance with a scaling ratio of N/M.

3. An electrophotographic image forming apparatus comprising the image processing apparatus according to claim 1.

4. The image processing apparatus according to claim 1, wherein the pixel of the growth center of the dither threshold value matrix and the center pixel in the processing using the filter coincide with each other by shifting one of or both the row and the column of the dither threshold value matrix in accordance with a difference between the pixel of the growth center of the dither threshold value matrix and the center pixel in the filter processing.

5. The image processing apparatus according to claim 1, wherein the pixel of the growth center of the dither threshold value matrix and the center pixel in the processing using the filter coincide with each other by shifting the center pixel in the filter processing in accordance with a difference between the pixel of the growth center of the dither threshold value matrix and the center pixel in the filter processing.

6. An image processing method, the method comprising the steps of:
performing dither processing on image data having a first resolution M by using a dither threshold value matrix;
perform rotation processing on the image data that is generated by the dither processing and which has the first resolution M; and
performing resolution conversion to convert the image data that is generated in the dither processing step and which has the first resolution M into image data having a second resolution N lower than the first resolution M by using a filter, wherein the pixel of a growth center of the dither threshold value matrix and a center pixel in the processing using the filter coincide with each other; and
deriving coordinates of an arbitrary dither processing growth center point in the image on which the rotation processing has been performed, wherein in the case where the phase of the arbitrary dither processing growth center point and the phase of the center of the filter do not coincide with each other, the phase of the center of the filter is moved so as to coincide with the phase of the arbitrary dither processing growth center point based on the derived coordinates, and the resolution conversion is performed in accordance with the center of the filter after the phase thereof is moved so as to coincide with the phase of the growth center point.

7. A dither threshold value matrix generation method, the method comprising the steps of:
determining whether the pixel of a growth center of a dither threshold value matrix used in dither processing and a center pixel in filter processing used for resolution conversion processing coincide with each other; and
generating a dither threshold value matrix after adjustment by adjusting the dither threshold value matrix so that the pixel of the growth center of the dither threshold value matrix and the center pixel in the filter processing coincide with each other in a case where the results of the determination in the determination step indicate that both the pixels do not coincide with each other,
wherein the dither threshold value matrix after the adjustment is generated by shifting one of or both the row and the column of the dither threshold value matrix in accordance with a difference between the pixel of the growth center of the dither threshold value matrix and the center pixel in the filter processing.

8. A non-transitory computer readable storage medium storing a program for causing a computer to perform the method according to claim 7.

* * * * *